Sept. 29, 1931.  N. L. MORTENSEN ET AL  1,825,009
CONTROLLER FOR ELECTRIC MOTORS
Filed July 11, 1928  2 Sheets-Sheet 2
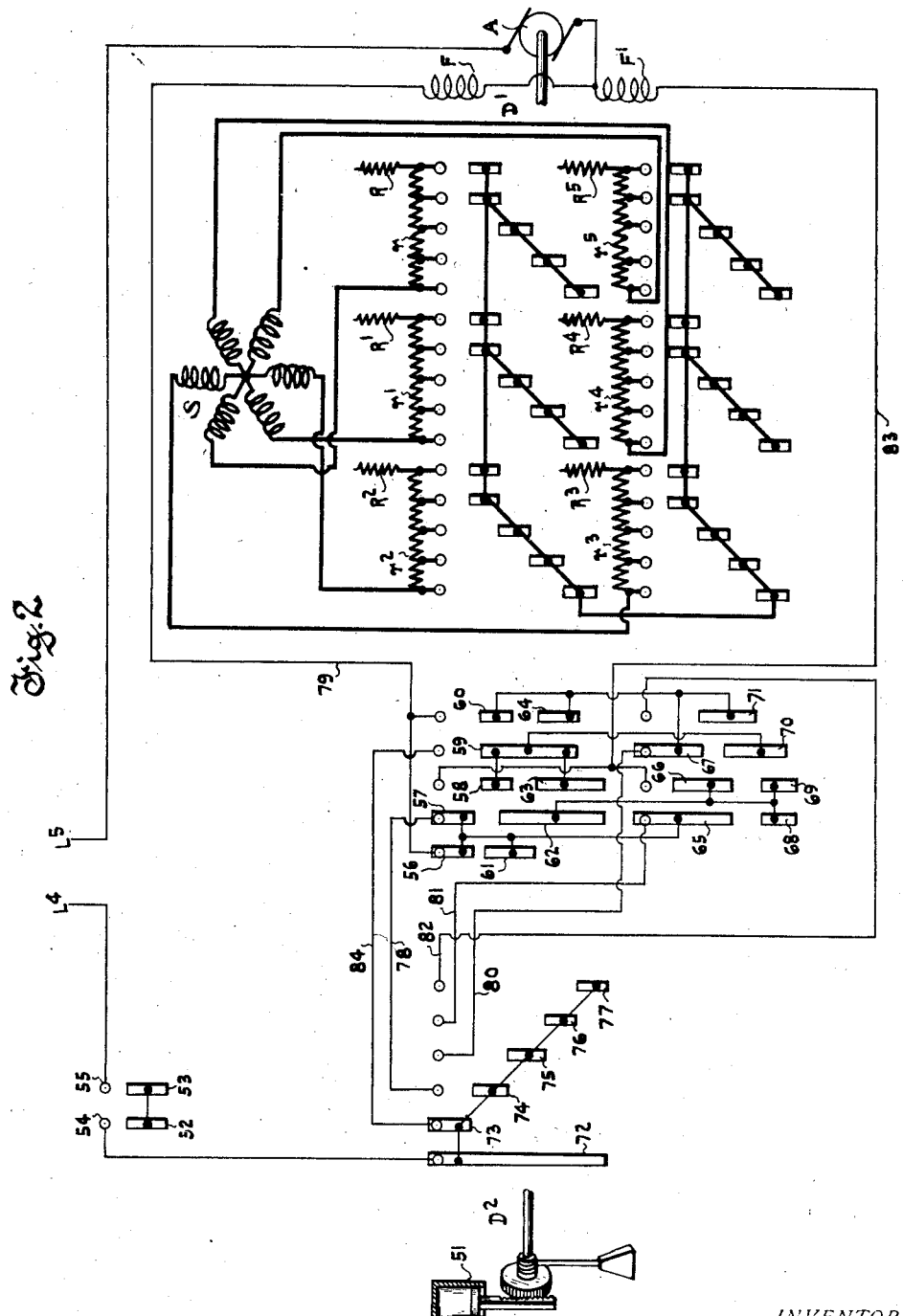
INVENTOR
Niels L. Mortensen
Edwin W. Seeger
ATTORNEY Patented Sept. 29, 1931

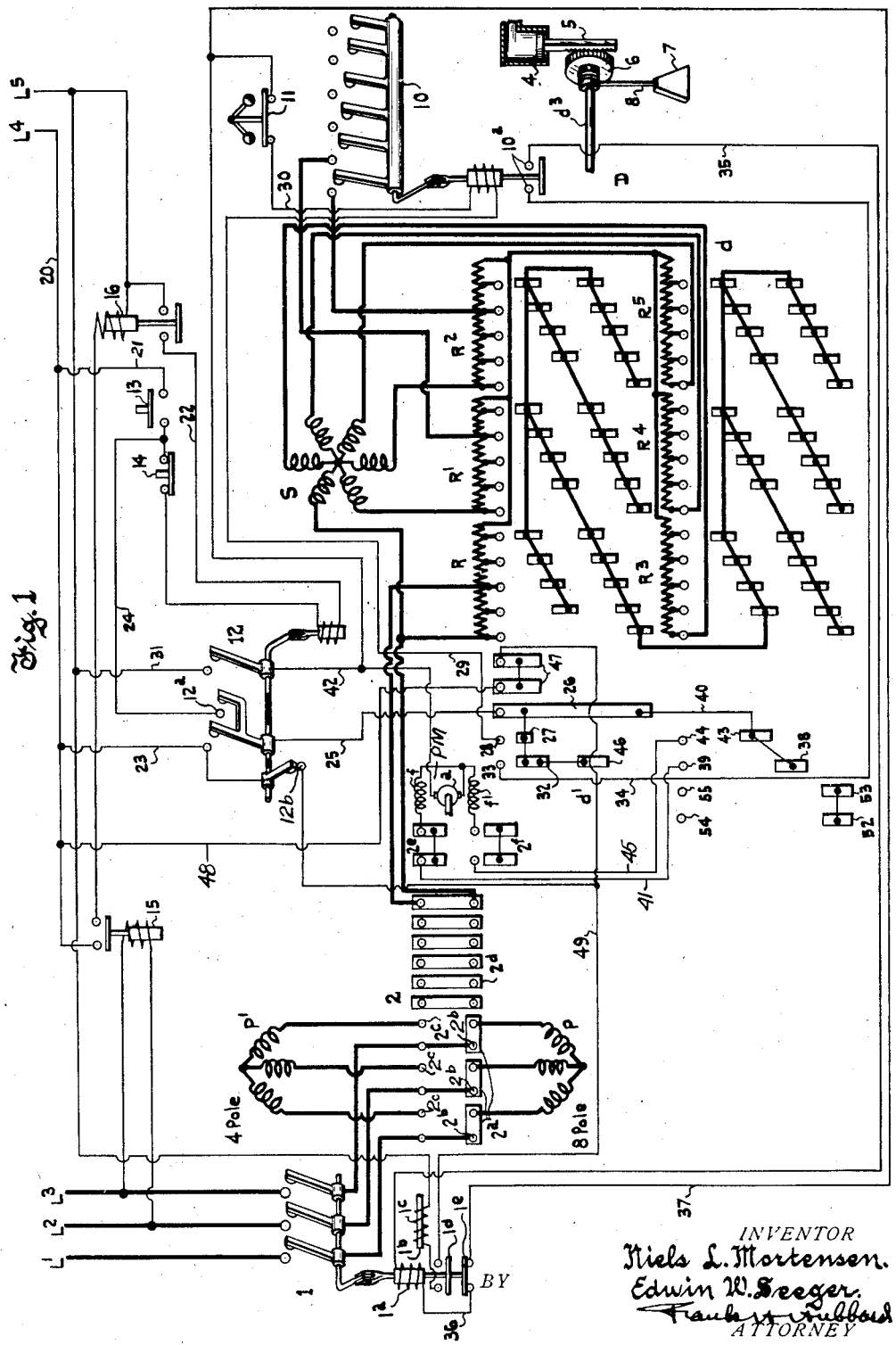

1,825,009

UNITED STATES PATENT OFFICE

NIELS L. MORTENSEN, OF MILWAUKEE, AND EDWIN W. SEEGER, OF WAUWATOSA, WISCONSIN, ASSIGNORS, BY MESNE ASSIGNMENTS, TO CUTLER-HAMMER INC., OF MILWAUKEE, WISCONSIN, A CORPORATION OF DELAWARE

CONTROLLER FOR ELECTRIC MOTORS

Application filed July 11, 1928. Serial No. 291,785.

This invention relates to improvements in controllers for electric motors.

While not limited thereto, the invention is especially applicable to controllers for fans employed to furnish combustion air to boilers and having separate slow speed and high speed driving motors or a single driving motor having slow speed and high speed windings affording a plurality of speed ranges.

As will be understood, successful automatic control of such devices requires variation of the speed thereof over a wide range in exceedingly small increments and decrements, and the present invention has among its objects to provide therefor and for overlap of the speed ranges of the one or more motors whereby after transfer from one speed range to another retransfer will only be required for a substantial speed reduction or increase as the case may be, and need for repeated and rapid commutations of the motor circuit to meet exacting speed requirements at this stage will be obviated.

Another object is to provide means minimizing the chance of stalling of the driven device within its low speed range.

Another object is to provide automatic control means of the aforementioned character which may be readily operated manually in emergencies.

Other objects and advantages of the invention will hereinafter appear.

The accompanying drawings diagrammatically illustrate one embodiment of the invention, and the same will now be described, it being understood that the system illustrated is capable of various modifications without departing from the scope of the appended claims.

In the accompanying drawings Figure 1 illustrates in a simplified form a system affording control of the aforementioned character, and Fig. 2 shows means providing for refinement of the system shown in Fig. 1.

Referring to Fig. 1, the system illustrated therein comprises a single driving motor of the induction type, said motor having separate low speed and high speed primary windings P and $P^1$, respectively, and a secondary winding S. While it is to be understood that separate motors might be employed in lieu of the motor shown and that the single motor selected for illustration might be of any preferred type, it will be assumed to have an 8 pole slow speed primary winding, a 4 pole high speed primary winding and a star connected secondary winding having six phases. Thus, as will be understood, the motor will provide for two speed ranges, and it is to be assumed that the motor is designed for an appreciable overlap of its speed ranges.

The motor is adapted to be connected to alternating current supply lines $L^1$, $L^2$, $L^3$ through a line switch or circuit breaker 1 and a switch 2 which provides for inclusion of the primary windings P and $P^1$ selectively. The switch 1 has a closing winding $1^a$, a latch $1^b$ for holding the same in closed position, an electromagnet $1^c$ for tripping said latch, and auxiliary contacts $1^d$ and $1^e$, the latter providing for disconnection of winding $1^a$ upon response of switch 1. Switch 2 is of the drum type operable by a reversible pilot motor PM having an armature $a$ and field windings $f$ and $f^1$ of opposite polarity. This drum has three segments $2^a$ cooperating with contacts $2^b$ to control the circuit of primary winding P and with contacts $2^c$ to control the circuit of primary winding $P^1$. Also, this drum has segments and contacts providing a six pole switch $2^d$ for control of the secondary circuit, as hereinafter described.

The control means for the secondary of the motor comprises resistances R, $R^1$, $R^2$, $R^3$, $R^4$ and $R^5$, one for each phase of the secondary S and each being connected to a number of contacts of a drum type controller D which is illustrated schematically as comprising two sections $d$ and $d^1$. The section $d$ is provided for controlling the resistances R to $R^5$, said section providing for simultaneous exclusion of said resistances in steps and having two sets of segments, one for resistance commutation for the slow speed range, and the other for resistance commutation for the high speed range. The section $d^1$ is provided for control of certain of the aforementioned windings and others hereinafter described, all of said windings being supplied from direct current lines $L^4$ and $L^5$.

While in practice the drum would ordinarily be driven by a motor under the control of a Bailey regulator or other preferred means and might, if desired, comprise separate slow speed and high speed sections so driven and controlled, it is shown for simplicity of illustration as operable in one direction against a bias, by a piston 4 subjected to a pressure in accordance with which the speed of the main motor is to be controlled. The piston 4 is shown as connected to the drum shaft $d^3$ through a rack 5 and pinion 6 and the drum is biased to rotate in one direction by a weight 7 suspended on rope or cable 8 attached to the drum shaft, the arrangement being such that the weight advances the drum form off position as the controlling pressure decreases, whereas the piston responds to an increasing pressure to return the drum towards off position.

As aforestated, the resistances R to $R^5$ are employed for both speed ranges of the motor and as less resistance is required for the slow speed range the poles $2^d$ of drum switch 2 are provided to short circuit a given amount of said resistance during connection of the slow speed primary winding P. Such short circuiting of the desired amount of resistance may be accomplished by connecting the several poles $2^d$ of switch 2 to the several resistances in the manner exemplified in connection with the extreme right hand pole $2^d$. As will be observed, the extreme right hand pole $2^d$ has connections with resistance R whereby it short circuits two steps thereof. Also provision is made for temporarily short circuiting a further amount of the resistance controlled by the drum, for initially starting the motor. This means comprises an electroresponsive switch 10 under the control of a governor operated switch 11 or other preferred device responsive to speed variations of the main motor. As will be hereinafter explained, such means further provides for minimizing the chance of stalling of the motor within its slow speed range. Switch 10 which has six poles is preferably provided with connections between the same and the several resistances whereby portions of the latter will be excluded by shifting of the star point connection thereof. For simplicity of illustration only two of the poles of switch 10 are shown as connected to their respective resistance sections, but it will be apparent that if the remaining poles are similarly connected to the remaining resistances respectively they will provide a star connection which will exclude two steps of each of said resistances.

The additional control means illustrated comprises an electroresponsive switch 12 which must be energized to render the system operative, a push button switch 13 to initially energize switch 12, a push button switch 14 to deenergize switch 12 and electroresponsive relays 15 and 16 rendering switch 12 subject to deenergization upon failure of voltage in either the A. C. supply circuit or the D. C. supply circuit.

Assuming normal voltage of the alternating current supply circuit, the relay 15 which has its winding connected across lines $L^2$ and $L^3$ will connect the winding of relay 16 across the direct current supply lines $L^4$ and $L^5$, and assuming normal voltage of the direct current supply circuit the system described may be rendered operative by depression of push button switch 13. Depression of this switch under such conditions energizes switch 12. The energizing circuit for switch 12 may be traced from line $L^4$ by conductors 20 and 21 through switch 13 and switch 14 to and through the winding of switch 12, by conductor 22 through the relay 16 to line $L^5$.

Switch 12 upon responding establishes a maintaining circuit for its operating winding extending from line $L^4$ by conductors 20 and 23 through the left hand pole of switch 12 to an auxiliary contact $12^a$ thereof, by conductor 24 through switch 14 and thence through the winding of switch 12, as already traced. Further, switch 12 through its left hand pole completes circuit from line $L^4$ by conductors 20, 23 and 25 to a segment 26 of drum section $d^1$ of drum D.

Thus preparation is made for starting the main motor when the pressure condition is such as to cause the weight 7 to advance the drum D. Upon initial advance of the drum D circuit is completed from drum segment 26 to segment 27 and contact 28 by conductor 29 to and through the operating winding of switch 10 by conductor 30 through the governor operated switch 11 to the right hand pole of switch 12 by conductor 31 to line $L^5$. This causes response of switch 10 to exclude a portion of the secondary resistance as heretofore described and further to complete the energizing circuit of main switch 1. This circuit may be traced from line $L^4$ to drum segment 26 as heretofore described and thence to segment 32 and contact 33 by conductor 34 through auxiliary contacts $10^a$ of switch 10 by conductor 35 through the closing winding $1^a$ of switch 1 by conductor 36 through the contacts $1^c$ of switch 1 by conductor 37 to and through the right hand pole of switch 12 by conductor 31 to line $L^5$. Thus the main switch is closed to connect the motor to the line for excitation of its slow speed primary winding P, the drum switch 2 being in the position illustrated for selection of such winding.

Following starting of the main motor the governor operated switch 11 will be opened to deenergize switch 10 for reinclusion of the secondary resistance previously excluded thereby. Thus extreme slow speed operation of the motor is provided for, and as will be apparent should the motor thereafter tend to stall the switch 11 will reclose to again energize switch 10 for temporary exclusion of part of the secondary resistance. On the other hand, assuming further advance of the drum D by the weight 7 the secondary resistance will be gradually excluded from circuit by said drum and upon a predetermined advance of the drum segment 27 will be disengaged from contact 28, thereby disabling switch 10.

Further advance of the drum after excluding all of the secondary resistance will effect its reinclusion and slightly in advance thereof will effect operation of drum switch 2 to exclude the slow speed primary winding P and include the high speed primary winding $P^1$ and also to include in the secondary circuit the resistance previously short-circuited by the poles $2^d$ of switch 2. Accordingly such further advance of the drum will effect transfer from the slow speed range to the high speed range.

More particularly, such further advance of the drum will effect engagement of its segment 38 with contact 39 to complete the circuit of pilot motor PM, said circuit extending from line $L^4$ to drum segment 26 as previously traced by conductor 40 to drum segment 38 and contact 39 by conductor 41 through limit contacts $2^e$ of drum switch 2 to and through the field $f$ and armature $a$ of the pilot motor by conductor 42 through the right hand pole of switch 12 to line $L^5$. This circuit is interrupted by contacts $2^e$ upon shifting of drum switch 2 to exclude the slow speed primary winding P and to include the high speed primary winding $P^1$ but switch 2 remains in high speed position pending reverse operation of the pilot motor. As will appear, the pilot motor is not reversed until the drum D is returned to a given position and hence the high speed primary winding is maintained in circuit throughout further advance of drum D whereas such further advance of the drum again gradually excludes the secondary resistance for higher speeds as required. Reverse operation of pilot motor PM for retransfer of the motor to its slow speed range is provided for by a segment 43 on drum D, said segment being engageable with a contact 44 to complete circuit from segment 26 by conductor 40 to conductor 45 and thence through limit contacts $2^f$ on drum switch 2 to and through field $f^1$ and armature $a$ of said pilot motor to line $L^5$ as previously traced. Thus provision is made for return of the drum switch 2 to the position illustrated while the drum D is in an intermediate position, and as will be understood, return of switch 2 again functions through its contacts $2^d$ to short circuit portions of the secondary resistance. Also, as will be understood, further return movement after retransfer will gradually insert secondary resistance for further speed reduction.

Again referring to the drum segments 38 and 43 which control the pilot motor of the transfer switch, it is to be noted that the same are spaced radially of the drum to effect transfer of the motor from one speed range to another and retransfer in different intermediate positions of the drum to thus provide the aforementioned overlap of the two speed ranges. Hence provision is made both in accelerating and in decelerating for obviating the necessity of retransfer from one speed range to another for slight variations in the controlling pressure at the instant of or following transfer.

As will be observed, energization of the main switch 1 is dependent upon engagement with drum contact 33 of segment 32, or segment 46 and these segments are so arranged as to complete said circuit only when the drum occupies positions including a substantial amount of resistance in the secondary circuit of the motor. Accordingly should the switch 1 trip in any other position of the drum it could not be reenergized pending movement of the drum to reinclude resistance in the secondary circuit for either the slow speed range or the high speed range. Also, it will be observed that provision is made for tripping the switch 1 upon return of the drum to off position or upon deenergization of switch 12 either by depression of the push button switch 14 or failure of voltage. This means comprises a pair of drum segments 47 which in the off position of the drum engage contacts to complete circuit from line $L^4$ by conductor 48 through said segments 47 and their associated contacts by conductor 49 through the contacts $1^d$ of switch 1 and through the tripping winding $1^c$ to line $L^5$. Further, this means comprises down contacts $12^b$ of switch 12, which, as will be apparent, parallel the drum segments 47 and their associated contacts.

In practice it is sometimes desirable to provide for accurate balancing of the resistance in all phases of the motor at the higher speeds thereof and such is the refinement provided for by the means shown in Fig. 2. This means comprises additional resistances $r$, $r^1$, $r^2$, $r^3$, $r^4$, and $r^5$ for the secondary circuit and a drum $D^1$ for excluding said resistances in steps. The resistances $r$ to $r^5$ may be connected between the corresponding resistances R to $R^5$ and their respective windings of the secondary S.

The drum $D^1$ is operated by a pilot motor having an armature A and series fields F, $F^1$ of reverse polarity, the circuits of said motor being controlled by segments of drum $D^1$ in conjunction with a drum $D^2$ having operating means 51 similar to the drum operating means of Fig. 1. Drum $D^2$ has a line connection to be controlled by segments 52 and 53 of the drum D shown in Fig. 1, said segments being engageable with contacts 54 and 55, respectively, in the high speed position of said drum of Fig. 1.

As shown in Fig. 2, the aforementioned contacts and segments of drum D of Fig. 1 control a connection between drum $D^2$ and supply line $L^4$. With this line connection established to drum $D^2$ movement of this drum completes circuit from line $L^4$ to contacts of drum $D^1$ progressively to effect operation of the pilot motor for gradual exclusion of the resistances $r$ to $r^5$, and as will appear provision is made for a follow-up control whereby the pilot motor is insured against arrest except in such positions as effect like commutations of the several resistances $r$ to $r^5$, thus insuring balance of all phases of the motor circuit. Also as will appear, provision is made for always interrupting the pilot motor circuit at two points in series relation whereby undesirable arcing on the control contacts of drum $D^1$ is prevented.

More particularly, the control means for the pilot motor of drum $D^1$ comprises contact segments 56 to 71 on drum $D^1$ which are arranged in two groups 56 to 64 and 65 to 71 having separate sets of contact fingers or buttons to be engaged thereby. Also, said control means comprises segments 72 to 77 on drum $D^2$ having a single set of contact fingers or buttons to be engaged thereby. As will be apparent, the segments 73 to 77 are arranged for progressive engagement with their respective contact fingers or buttons upon reverse operations of drum $D^2$ to complete circuit from line $L^4$ to certain contact fingers or buttons of drum $D^1$ progressively.

As shown, the drum $D^2$ is in an extreme position corresponding to a maximum pressure within device 51 and accordingly drum $D^1$ is shown in a position to include the resistances $r$ to $r^5$ and to interrupt its pilot motor circuit. However, if it be assumed that the pressure within device 51 decreases to engage segment 74 with its contact button it will be apparent that circuit will at once be completed through armature A and field F of the pilot motor for advance of the drum $D^1$ to exclude one step of each of resistances $r$ to $r^5$. Such circuit may be traced from line $L^4$ to and through segments 72 and 74 of drum $D^2$ by conductor 78 to and through interconnected segments 56 and 57 of drum $D^1$ by conductor 79 to and through the pilot motor to line $L^5$, this circuit being interrupted by segments 56 and 57 when drum $D^1$ has moved one full step. In this connection it is to be understood that the drum $D^2$ is assumed to maintain the circuit of the pilot motor for the aforementioned full step of drum $D^1$, and it is to be noted that when segments 56 and 57 disengage their contact buttons they interrupt the pilot motor circuit at two points in series relation.

Assuming continued movement of drum $D^2$ to its other extreme position the following circuits will be progressively established for the pilot motor with excitation of its field F for advance of the drum $D^1$ in step with drum $D^2$:

Segment 75 by conductor 80 to and through interconnected segments 67 and 60 to conductor 79 leading to pilot motor field F.

Segment 76 by conductor 81 to and through interconnected segments 65 and 61 to conductor 79.

Segment 77 by conductor 82 to and through interconnected segments 71 and 64 to conductor 79.

On the other hand, assuming return of the drum $D^2$ the pilot motor circuits will be varied for excitation of field $F^1$ and will be as follows:

Segment 76 by conductor 81 to and through interconnected segments 68 and 69 by conductor 83 through the field $F^1$ and armature A of the pilot motor to line $L^5$.

Segment 75 by conductor 80 to and through interconnected segments 70 and 63 to conductor 83.

Segment 74 by conductor 78 to and through interconnected segments 62 and 66 to conductor 83.

Segment 73 by conductor 84 to and through interconnected segments 59 and 58 to conductor 83.

As will be apparent, each of the foregoing pilot motor commutations provides for one step of movement of the drum $D^1$ in one direction or the other according to the direction of movement of drum $D^2$, for follow-up control whereby the drum $D^1$ is insured a full step of movement in each instance and for interruption of the pilot motor circuit at two points in series relation, as more fully explained in connection with the pilot motor circuit first discussed.

What we claim as new and desire to secure by Letters Patent is:

1. The combination with an electric motor drive having windings affording it a plurality of speed ranges, of control means for said drive including transfer means and speed regulating means affording overlap of the speed ranges for transfer.

2. The combination with an electric motor drive having windings affording it a plurality of speed ranges, of speed regulating means for said drive affording overlap of such speed ranges and separately operable means under the control of the former means to effect transfer of said drive from one range to another while said drive is operating within the overlap of such ranges.

3. The combination with an electric motor drive having windings affording it a relatively low speed range and a relatively high speed range, of speed regulating means for said drive affording overlap of such speed ranges and means under the control of the former means to transfer said drive from either speed range to the other while said drive is operating within the overlap of such ranges.

4. The combination with an electric motor drive having windings affording it a plurality of speed ranges, of electro-magnetically operated means for transferring said drive from one speed range to another and speed regulating means for said drive affording an overlap of such ranges and providing for operation of said transfer means but only after bringing said drive to a speed overlapping the range to which transfer is to be made.

5. The combination with an electric motor drive having a plurality of speed ranges, of separately operable devices to effect transfer of said drive from one range to another and to vary its speed within such ranges, the latter device affording drive speeds common to such ranges, and the former device having operating means responsive at certain of said speeds common to the speed ranges.

6. The combination with an electric motor drive having a plurality of speed ranges, of a pilot motor operated drum to effect transfer of said drive from one speed range to another and speed regulating means for said drive having control over said transfer drum to effect transfers at speeds common to the speed ranges.

7. The combination with an electric motor drive having windings affording it a plurality of speed ranges, of a pilot motor operated drum to commutate the circuits of said windings for transfer from one speed range to another, drum type speed regulating means to adjust the speed of said drive in each of such ranges and providing for overlap of the latter, and control means for said pilot motor operated drum associated with said speed regulating means to provide for transfer of said drive at speeds common to the speed ranges.

8. The combination with a polyphase electric motor drive having a plurality of speed ranges, of means to effect transfer of said drive from one range to another and to regulate its speed within each of such ranges, said means including resistance for the several phases of said motor drive and further including means insuring balance of the resistance in all phases for each of certain high speeds of said drive.

9. The combination with an electric motor drive for fans and other devices, said drive having a plurality of speed ranges, of means to regulate automatically in accordance with the demand on the driven device, the speed of said motor within each range and to provide for an overlap of such speed ranges and means controlled by the former means to effect transfer of said drive from one speed range to another within such overlap.

10. The combination with a polyphase electric motor drive for fans and other devices, said drive having windings to be energized selectively to afford it a plurality of speed ranges, of means responsive to varying demands on the driven device to regulate the speed of said drive within its several ranges and to provide for speeds common to such ranges and a switch controlled by said means to effect transfer of said drive from one range to another at speeds common thereto.

11. The combination with a polyphase electric motor drive having a plurality of speed ranges, of means to effect transfer of said drive from one range to another and to regulate its speed within each of such ranges, said means including resistances for the several phases of said motor drive and further including means insuring balancing of the resistances in all phases for each of certain high speeds of said drive, said last mentioned means comprising auxiliary resistances for the several phases of said motor drive, a drum movable to a plurality of predetermined positions sequentially to effect inclusion or exclusion of said last mentioned resistances in steps, a reversible pilot motor for operating said drum, said drum having contacts for control of said pilot motor, and an aditional control drum movable in either direction from given positions thereof and cooperating with said control contacts to complete circuit for operation of said pilot motor in a given direction, said control contacts being adapted to interrupt the circuit of said pilot motor upon movement of said first mentioned drum to each of said predetermined positions thereof, said control contacts being operable in each instance to effect interruption of the pilot motor circuit at a plurality of points in series relation whereby undesirable arcing on said control contacts is avoided.

12. The combination with an electric motor drive having windings affording it a plurality of speed ranges, of control means for said drive, said control means being operable automatically under given conditions to effect transfer of said drive from one speed range to another, said means including means to bring said drive to a speed within the latter range prior to such transfer, there being a number of speeds common to said ranges.

13. The combination with an electric motor drive having windings affording it a relatively low speed range and a relatively high speed range, of control means for said drive, said control means being operable automatically to effect transfer of said drive from either range to the other, said means including means effective in either case to bring the drive to one of a number of speeds common to the two ranges prior to such transfer.

14. The combination with an electric motor drive having windings affording it a plurality of speed ranges, of control means for said drive, said control means being operable automatically in response to given demand conditions to effect transfer of said drive from one speed range to another, said means including means to effect operation of said drive at a number of speeds common to such ranges during the transfer.

15. The combination with an electric motor drive having windings affording it a plurality of speed ranges, of control means for said drive including transfer means and speed regulating means affording overlap of the speed ranges for transfer, the transfer to one range being effected at a given speed of the motor drive and the transfer to the other range being effected at a different speed of the motor drive.

16. The combination with an electric motor drive having windings affording it a plurality of speed ranges, of control means for said drive including transfer means and speed regulating means affording overlap of the speed ranges for transfer, such transfer being effected at substantially the limit of the active speed range in each instance.

17. The combination with an electric motor drive having windings affording it a relatively low speed range and a relatively high speed range, of speed regulating means for said drive affording overlap of such speed ranges, and means under control of the former means to transfer said drive to the high speed range at substantially the upper limit of the low speed range and/or to transfer said drive to the low speed range at substantially the lower limit of the high speed range.

In witness whereof, we have hereunto subscribed our names.

NIELS L. MORTENSEN.
EDWIN W. SEEGER.